United States Patent [19]

Martorano

[11] Patent Number: 5,063,091

[45] Date of Patent: Nov. 5, 1991

[54] METHOD FOR USE OF AQUEOUS ELASTOMERIC COATINGS

[75] Inventor: Richard Martorano, Marlton, N.J.

[73] Assignee: Rohm and Haas Company, Philadelphia, Pa.

[21] Appl. No.: 418,293

[22] Filed: Oct. 6, 1989

[51] Int. Cl.$^5$ ............................................. B05D 3/02
[52] U.S. Cl. ................................. 427/385.5; 427/136; 427/393.6; 524/535
[58] Field of Search ............... 427/136, 393.6, 393.5, 427/385.5; 404/32; 524/535

[56] References Cited

U.S. PATENT DOCUMENTS

| | | | |
|---|---|---|---|
| 4,082,888 | 4/1978 | Portin | 404/32 |
| 4,107,120 | 8/1978 | Plamondon et al. | 524/829 |
| 4,170,582 | 10/1979 | Mori et al. | 524/535 |
| 4,230,772 | 10/1980 | Swift et al. | 427/393 |
| 4,289,675 | 9/1981 | Krajewski | 428/500 |
| 4,293,476 | 10/1981 | Moore et al. | 524/555 |
| 4,465,803 | 8/1984 | Nakayama | 524/460 |
| 4,487,860 | 12/1984 | Winner et al. | 523/100 |
| 4,569,964 | 2/1986 | Lee et al. | 524/460 |
| 4,576,987 | 3/1986 | Crockatt et al. | 524/487 |
| 4,683,273 | 7/1987 | Bode | 525/63 |
| 4,814,373 | 3/1989 | Frankel et al. | 524/460 |
| 4,897,302 | 1/1990 | Bull | 427/407.1 |

FOREIGN PATENT DOCUMENTS

| | | |
|---|---|---|
| 258988 | 9/1988 | European Pat. Off. . |
| 50-100130 | 8/1975 | Japan . |
| 62-79875 | 4/1987 | Japan . |
| 1423525 | 9/1988 | U.S.S.R. . |

Primary Examiner—Michael Lusignan
Assistant Examiner—Diana L. Dudosh

[57] ABSTRACT

A method for using an ambient-temperature-drying aqueous elastomeric coating composition is provided. The coating composition comprises at least two mutually incompatible water-insoluble polymers, with at least one of the polymers comprising N-methylol functionality. The coating composition is used, for example, for high gloss elastomeric wall coatings or for sports surface coatings.

12 Claims, No Drawings

METHOD FOR USE OF AQUEOUS ELASTOMERIC COATINGS

FIELD OF THE INVENTION

This invention relates to a method of using an ambient-temperature-drying aqueous elastomeric coating composition comprising at least two mutually incompatible water-insoluble polymers, wherein at least one of said polymers comprises N-methylol functionality. More particularly, this invention is directed to a method of using elastomeric coatings, such as, for example, high gloss elastomeric wall coatings or sports surface coatings.

BACKGROUND OF THE INVENTION

Protective and decorative coatings for flexible or extensible substrates require low temperature flexibility due to the need for the coating film to withstand stresses at low temperatures while in the same application requiring the coating film to exhibit low surface tack at elevated temperatures. Such coatings are known as elastomeric coatings. While aqueous dispersions of water-insoluble polymers of lower than ambient glass transition temperature (Tg) are advantageously used for many ambient temperature applications with little or no need for polluting volatile organic coalescing aids, the dried films of such low Tg polymer coatings are too tacky for many coatings applications. On the other hand, higher than ambient temperature Tg polymers disadvantageously required higher levels of polluting volatile organic coalescing aids to effect film formation while providing dried coatings films with insufficient low temperature flexibility. The method of this invention provides for the use of single coat ambient-temperature-drying elastomeric coatings with the desired balance of low temperature flexibility and lack of tack at higher than ambient temperatures.

DESCRIPTION OF THE PRIOR ART

JP 62-79875 discloses a waterproofing method, as characterized by forming a coated film, having a thickness of 100–1000 microns, made of a polymer containing more than 50 wt. % of alkyl acrylate ester where the number of carbons in the alkyl group is greater than 4, and having greater than 500% elongation at 20 C. and no higher than 10 kgf./cm.2 tensile strength, on the surface of a building structure, and subsequently forming a coated film having no lower than 10 kgf./cm.2 tensile strength at 20 C. and made of a polymer having no higher than 10 C. glass transition, on the surface of aforesaid coated film. Also disclosed is formation of the coated film on the roof and outer wall surface of a concrete structure. Application of the two coatings in one step is not disclosed.

JP 50-100130 discloses a mastic coating method, as characterized by coating mastic paint on the substrate, followed by coating a dispersion of resin composition having lower than 0 C. glass transition point so that the solid component will be at least 9 g./m2., and subsequently coating an emulsion-like resin composition having higher than 20 C. glass transition point after drying. This is a three-coat system; application of a single coating to achieve the objectives met by this multiple coating system is not disclosed.

SU 1,423,525 A discloses a mixture for surfacing sporting fields, especially tennis courts, which mixture comprises an oligo-acrylate, rubber, resin crumbs, a vulcanizing agent, ferric oxide, a N-containing tetrafunctional block copolymer of ethylene oxide and propylene oxide, and water. The mixture is vulcanized for 20–45 minutes at 150–180 C.

U.S. Pat. No. 4,814,373 discloses an aqueous dispersion of an improved water-insoluble latex which yields soft coatings which are toughened relative to prior art coatings withoiut requiring treatment with an external crosslinking agent. The improved water-insoluble latex is prepared by a process comprising a) preparing by emulsion polymerization an initial aqueous dispersion of a water-insoluble latex polymer of at least one ethylenically unsaturated monomer, wherein said ethylenically unsaturated monomer comprises no more than about two percent by weight, based on the total weight of said ethylenically unsaturated monomer, of multi-ethylenically unsaturated monomer and wherein said initial water-insoluble latex polymer otherwise contains essentially no sites of ethylenic unsaturated, b) dispersing in said initial aqueous dispersion of initial water-insoluble latex polymer additional ethylenically unsaturated monomer comprising at least one monomer having at least two sites of ethylenic unsaturation, whereby said additional monomer swells said initial polymer, and c) polymerizing said additional monomer within said monomer-swollen polymer. Disclosed are uses of the improved water-insoluble latex in coating compositions, roof mastics, caulks, and sealants.

None of the references teach the use of a single ambient-temperature-drying aqueous coating comprising at least two water-insoluble polymers to provide an elastomeric surface coating such as, for example, a high gloss elastomeric wall coating or a sports surface coating.

It is an object of this invention to provide a method of use of a single ambient-temperature-drying aqueous elastomeric coating composition comprising at least two mutually incompatible water-insoluble polymers, wherein at least one of said polymers comprises N-methylol functionality, as an elastomeric surface coating.

It is an object of this invention to provide a method whereby a low-temperature-flexible, low tack, high gloss elastomeric wall coating is applied to a wall. It is a further object of this invention to provide a method whereby a low-temperature-flexible, low tack sports surface coating such as, for example, a running track coating or a tennis court coating, is applied to a sports surface.

SUMMARY OF THE INVENTION

A method is provided whereby an ambient-temperature-drying aqueous elastomeric coating composition comprising at least two mutually incompatible water-insoluble polymers, wherein at least one of said polymers comprises N-methylol functionality, is applied to a surface.

DETAILED DESCRIPTION OF THE INENTION

This invention is directed to the method of using an ambient-temperature-drying aqueous elastomeric coating composition comprising at least two mutually incompatible water-insoluble polymers, wherein at least one of said polymers comprises N-methylol functionality, on a surface.

An aqueous elastomeric coating composition of this invention comprises at least one aqueous dispersion, emulsion, suspension, or latex. The coating composition comprises at least two mutually incompatible water-insoluble polymers, wherein at least one of said polymers comprises N-methylol functionality.

The mutually incompatible water-insoluble polymers may be present as different discrete particles such as, for example, in the form of a blend of at least two latexes of different, mutually incompatible compositions. Alternatively, the mutually incompatible water-insoluble polymers may be present as at least two different phases within individual polymeric particles such as, for example, a core/shell latex particle composed of one core and at least one shell wherein the core and shell(s) are mutually incompatible compositions.

Mutually incompatible polymers are defined herein as polymers which yield discrete phases in an applied coating film when applied in the method of use of this invention. Discrete phases in a coating film may be observed by staining and microscopy techniques known in the art.

The water-insoluble polymers may be prepared individually by conventional emulsion polymerization techniques and blended together. Alternatively, the water-insoluble polymers may be prepared by conventional core/shell techniques or by other techniques which yield at least two polymeric phases. Alternatively, they may be prepared by the modified latex polymer composition process taught in U.S. Pat. No. 4,814,373, which is hereby incorporated herein by reference.

The mutually incompatible water-insoluble polymers will yield an ambient-temperature-drying composition when at least one of the polymers is capable of forming a film under ambient conditions. At least one polymer with a Tg of about 20 C. or lower is preferred. More preferred is at least one polymer with a Tg of about 0 C. or lower. The proportion of the polymer composition which is capable of forming a film under ambient conditions will affect the ambient temperature film forming ability of the composition. Preferred is from about 25 to about 99 percent by weight of at least one polymer with a Tg of about 20 C. or lower.

Any monomer mixture which yields mutually incompatible water-insoluble polymers may be used in the composition of this invention. For example, acrylic ester monomers including methyl acrylate, ethyl acrylate, butyl acrylate, 2-ethylhexyl acrylate, decyl acrylate, methyl methacrylate, butyl methacylate; acrylic acid, methacrylic acid, itaconic acid, maleic acid, fumaric acid, styrene, substituted styrenes, butadiene, actylonitrile, vinyl acetate, and the like may be used. Further, other functional monomers such as, for example, hydroxyalkyl acrylates or methacrylates, amino-functional monomers, or sulfonic-functional monomers may be used. Also, multi-ethylenically unsaturated monomers such as, for example, 1,3-butyleneglycol dimethacrylate or trimethylol propane triacrylate, may be used.

It is required that at least one of the polymers of the composition of this invention contain N-methylol functionality. This functionality may be generated by post-reaction of a polymer containing reactive fuctionality such as, for example, acrylamide functionality. It is preferred to incorporate the N-methylol functionality in the polymer through the copolymerization of a N-methylol functional monomer such as, for example, N-methylol acrylamide or N-methylol methacrylamide. It is preferred to incorporate from about 1% to about 6%, by weight, based on the weight of the N-methylol-functional polymer, into at least one of the polymers.

It is preferred that a low level of acid-containing monomer such as, for example, from about 0.5% to about 3%, based on the weight of each polymeric component, be incorporated into the latex polymer. Low levels of acid are beneficial to the stability of the latex polymer, but higher levels are detrimental to the water resistance properties of the applied coating.

Chain transfer agents, including mercaptans and halogen-containing compounds, are sometimes desirable in the reaction mixture in order to moderate the molecular weight of the polymer. Generally from about 0% to about 3%, by weight of chain transfer agent, based on the weight of the polymer to be modified, is used.

In addition to the polymeric binder components, conventional coatings components such as, for example, pigments, dispersants, surfactants, coalescents, wetting agents, thickeners, rheology modifiers, drying retarders, plasticizers, biocides, defoamers, colorants, waxes, and the like, may be used in the coating composition of this invention.

Applications of the coating composition may be made to various substrates such as, for example, concrete block walls, running track substrates, tennis court surfaces, wall panels, and the like or to previously painted, primed, undercoated, worn, or weathered substrates.

The application of the coating composition may be made by conventional coating techniques such as, for example, brush, roller, mop, air-assisted spray, airless spray, and the like.

The following examples are intended to illustrate the method of applying an elastomeric coating composition, to which this invention is directed. They are not intended to limit the invention as other applications of the invention will be obvious to those of ordinary skill in the art.

Example 1

Preparation of Latex Polymer

Preparation of Sample 1. To a 5. gallon stired, jacketed reactor fitted with a nitrogen sparge tube was added 3712.5 g. deionized water (DI water). The water in the kettle was heated to 82 C.; at 82 C. 0.1 g. Moroxol ® 20 (inhibitor) dissolved in 24.75 g. DI water was added to the kettle with stirring. Nitrogen flow was turned on for 15 minutes. After the nitrogen sweep was ended, 19.8 g. Alipal ® CO-436 (surfactant) in 49.5 g. DI water was added at 82 C. The temperature had dropped to 80 C. when 618.75 g. of monomer emulsion 1 (ME #1) was added. Two minutes later with the temperature at 78 C. a solution of 37.4 g. of ammonium persulfate dissolved in 148.5 g. DI water was added. An exotherm was noted; the peak occurred three minutes later with a temperature of 82 C. Ten minutes later with the temperature at 83 C., simultaneous addition of 15,356.55 g. of ME #1 at a rate of 48.4 g./min. and 5.4 g. of ammonium persulfate in 495 g. DI water at a rate of 1.54 g./min. were begun. After twenty minutes, with the temperature then at 82 C., the feed rates were increased: ME #1 to 96.3 g./min. and the ammonium persulfate solution to 3.08 g./min.. The feeds ended 184 minutes after they began, with the temperature then at 82 C. The feed lines were rinsed into the reactor: ME #1 with 148.5 g. DI water and the ammonium persulfate solution with 74.25 g. DI water. The reaction mixture was then held for 29 minutes. At the end of this hold period the temperature was 80 C., and the reaction mixture was cooled to a temperature of 65 C. over a period of 32 minutes. At this point 44.6 g. of a 0.15% FeSO4.7 H2O, 5.4 g. sodium sulfoxylate formaldehyde in 99 g. DI water, and 9.9 g. t-butyl hydroperoxide in 49.5 g. DI water were added. Twenty minutes later, with the temperature at 63 C., 5.4 g. sodium sulfoxylate formaldehyde in 99 g. water and 9.9 g. t-butyl hydroperoxide in 49.5 g. DI water were added. Twenty minutes later with the temperature at 62 C., 53.4 g. ammonia (28%) was added over a period of four minutes. With the temperature then at 60 C., 19.8 g. of 5.66% PENNSTOP ® (radical scavenger) was added. After 5 minutes, with the temperature at 59 C., 333.8 g. butylene dimethacrylate was added. After 5 minutes, with the temperature at 57 C., 3.3 g. sodium sulfoxylate formaldehyde in 110 g. DI water and 5.5 t-butyl hydroperoxide in 55 g. DI water were added. In six minutes the temperature had risen to 59 C.; twenty minutes after the last addition, with the temperature at 58 C., 5.5 g. t-butyl hydroperoxide in 55 g. DI water was added. Cooling was resumed and 23 minutes later, with the temperature at 44 C., 29.2 g. 1.4% KATHON ® LX, 27.5 g. benzophenone in 19.8 g. xylene, and 744.4 g. DI water were added. The resultant latex polymer had 51.24% solids, a trace of 100 mesh gel, a particle size of 151 nm, pH=6.92, and a viscosity of 625 centipoises.

TABLE 1.1

| Monomer Emulsion for Example 1. (ME #1) | |
| --- | --- |
| DI water | 3613.5 g. |
| ALIPAL ® CO-436 (58%) | 72.6 g. |
| Butyl acrylate | 8096.0 g. |
| Methyl methacrylate | 1101.1 g. |
| Styrene | 1101.1 g. |
| Acrylonitrile | 328.9 g. |
| N-methylolmethacrylamide (25%) | 1544.3 g. |
| Acrylic acid | 107.8 g. |

EXAMPLE 1

Preparation of Latex Polymer

Preparation of Comparative Sample A. To a 1 gallon stirred, jacketed reactor fitted with a nitrogn sparge tube which reactor contained 750 g. DI water, the temperature of which had been raised to 83 C., 0.02 g. MAROXOL ® (inhibitor) in 5 g. DI water was added. Nitrogen flow to the reactor was turned on for 15 minutes. The nitrogen flow was turned off and 4 g. ALIPAL ® CO-436 in 10 g. DI water was added. Two minutes later with the temperature still at 83 C. 125 g. of monomer emulsion was added (ME #1). The temperature dropped to 80 C. within two minutes, at which time 7.6 g. ammonium persulfate in 30 g. DI water was added. An exotherm was noted which peaked in about 7 minutes; seven minutes later, at a temperature of 82 C., the addition of the remaining 3102.3 g. ME #1 and of 1.1 g. ammonium persulfate in 100 g. DI water were begun. Twenty minutes later, with the temperature at 82 C., the feed rates were increased. The feeds were completed 159 minutes later, the temperature was 82 C., and the feed lines were rinsed into the reactor, the monomer emulsion feed line with 30 g. DI water and the ammonium persulfate solution feed line with 15 g. DI water. Thirty minutes later, with the temperature then at 80 C., cooling was begun. Thirty-nine minutes later with the temperature at 66 C. 9 g. FeSO4.7 H2O (0.15% solution in water), 1.1 g. sodium sufoxylate formaldehyde in 20 g. DI water, and 2 g. t-butyl hydroperoxide (70%) in 10 g. DI water were added. Fifteen minutes later with the temperature at 64 C., 1.1 g. sodium sulfoxylate formaldehyde in 20 g. DI water and 2 g. t-butyl hydroperoxide (70%) in 10 g. DI water were added. Fifteen minutes later, with the temperature at 63 C., 1.1 g. sodium sulfoxylate formaldehyde in 20 g. DI water and 2 g. t-butyl hydroperoxide in 10 DI water were added. Twenty minutes later, with the temperature at 54 C., 10.8 g aqueous ammonia (28%) was added slowly. Thirty-four minutes later, with the temperture at 44 C., 5.9 g. KATHON ® LX (1.4%) (bacteriocide), 5.6 g. benzophenone in 4 g. xylene, and dilution DI water were added. The resultant latex has a solids content of 52.4%; pH=4.28; viscosity of 470 cps.; and 0.01 g./qt. of 100 mesh gel.

TABLE 2.1

| Monomer Emulsion for Example 2. (ME #1) | |
| --- | --- |
| DI water | 730 g. |
| ALIPAL ® CO-436 (60%) | 14.7 g. |
| Butyl acrylate | 1635.6 g. |
| Methyl methacrylate | 222.4 g. |
| Styrene | 222.4 g. |
| Acrylonitrile | 66.4 g. |
| N-Methylol methacrylamide (25%) | 314 g. |
| Acrylic acid | 21.8 g. |

EXAMPLE 3

Preparation of Latex Polymer

Preparation of Sample 2. To a 1. gallon stirred, jacketed reactor fitted with a nitrogen sparge tube was added 675 g. deionized water (DI water). The water in the kettle was heated to 82 C.; at 82 C. 0.02 g. Moroxol 20 (inhibitor) dissolved in 4.5 g. DI water was added to the kettle with stirring. Nitrogen flow was turned on for 15 minutes. After the nitrogen sweep was ended, 3.6 g. Alipal ® CO-436 (58%) (surfactant) in 4.5 g. DI water was added at 83 C. The feed line was rinsed with 4.5 g. DI water. The temperature had dropped to 81 C. when 1125.5 g. of monomer emulsion 1 (ME #1) was added. Two minutes later with the temperature at 77 C. a solution of 6.8 g. of ammonium persulfate dissolved in 27 g. DI water was added. An exotherm was noted; the peak occurred four minutes later with a temperature of 84 C. Ten minutes later, with the temperature at 82 C., simultaneous addition of 2580.2 g. of ME #1 and 0.99 g. of ammonium persulfate in 90 g. DI water were begun. After twenty minutes, with the temperature at 82 C., the feed rates were doubled. The feeds ended 182 minutes after they began, with the temperature then at 83 C. The feed lines were rinsed into the reactor: ME #1 with 27 g. DI water and ammonium persulfate solution with 13.5 g. DI water. The reaction mixture was then held for 30 minutes. At the end of this hold period the temperature was 81 C., and the reaction mixture was cooled to a temperature of 66 C. over a period of 17 minutes. At this point 8.1 g. of a 0.15% FeSO4.7 H2O, 0.99 g. sodium sulfoxylate formaldehyde in 18 g. DI water, and 1.8 g. t-butyl hydroperoxide in 9 g. DI water were added. Twenty minutes later, with the temperature at 62 C., 0.99 g. sodium sulfoxylate formaldehyde in 18 g. water and 1.8 g. t-butyl hydroperoxide in 9 g. DI water were added. Twenty-four minutes later the temperature was 62 C., 9.7 g. ammonia (28%) was added over a period of five minutes. With the temperature then at 59 C., 3.6 g. of 5.66% PENNSTOP ® (radical scavenger) was added. After 5 minutes, with the temperature at 59 C., 60.7 g. butylene glycol dimethacrylate was added. After 5 minutes, with the temperature at 57 C., 0.6 g.

sodium sulfoxylate formaldehyde in 20 g. DI water and 1.0 g. t-butyl hydroperoxide in 10 g. DI water were added. In three minutes the temperature had risen to 60 C.; twenty-three minutes after the last addition, with the temperature at 58 C., 1.0 g. t-butyl hydroperoxide in 10 g. DI water was added. Cooling was resumed and 37 minutes later, with the temperature at 44 C., 5.3 g. 1.4% KATHON ® LX, 8.3 g. benzophenone (60.24%) in 5 g. xylene, and 135.44 g. DI water were added. The resultant latex polymer had 50.4% solids.

TABLE 3.1

| Monomer Emulsion for Example 3. (ME #1) | |
| --- | --- |
| DI water | 657. g. |
| ALIPAL ® CO-436 (58%) | 13.2 g. |
| Butyl acrylate | 1472.0 g. |
| Methyl methacrylate | 200.2 g. |
| Styrene | 200.2 g. |
| Acrylonitrile | 59.8 g. |
| N-methylolmethacrylamide (25%) | 282.6 g. |
| Acrylic acid | 19.6 g. |

EXAMPLE 4

Preparation of Latex Sample

Preparation of Comparative Sample B. To a 5 gallon stirred, jacketed reactor fitted with a nitrogen sparge tube which contained 3819.5 g. DI water which had been heated to 85 C., was added 5.3 g. sodium bicarbonate and 17.7 g. ammonium persulfate in 110.5 g. DI water. Two minutes later, with the temperature at 83 C., 631.3 g. of a small particle size 45% solids preformed latex seed polymer was added and rinsed into the reactor with 125.5 g. DI water. One minute later, with the temperature at 77 C., the gradual, uniform feeds of the monomer emulsion (ME #1) and of a solution of 11.9 g ammonium persulfate in 888.1 g. DI water were begun. After 177 minutes the temperature of the reaction mixture was 83 C., the feed of the ammoium persulfate solution has been completed, and the feed line was rinsed with DI water Fourteen minutes later the feed of ME #1 was complete and the feed line was washed into the reactor with 137.5 g. DI water. Thirty minutes later 11.9 g. aqueous ammonia (28%) in 31.4 g. DI water; the temperature was 80 C. Five minutes later, with the temperature at 79 C., 1.6 g. sodium sulfoxylate formaldehyde in 44.2 g. DI water and 1.46 g t-butyl hydroperoxide (70%) in 22.5 g. DI water was added. The reaction mixture was cooled to 63 C. over the period of 31 minutes. Then 1.6 g. sodium sulfoxylate formaldehyde in 44.2 g. DI water and 1.46 g. t-butyl hydroperoxide (70%) in 22.5 g. DI water were added. Fifteen minutes later, the temperature was 62 C. and 1.6 g sodium sulfoxylate formaldehyde in 44.2 g. DI water and 1.46 g. t-butyl hydroperoxide in 22.5 g. DI water were added. After 154 minutes, with the temperature then being 49 C., 132.7 g. of 14% aqueous ammonia was added. Eight minutes later 73.8 g. of a 44% solution of benzophenone in xylene was added. Seven minutes later, with the temperature at 44 C., 48.6 g. PROXEL ® CRL (10% solution) and 265 g. DI water were added. The resulting latex was 55.24% solids with a theoretical conversion of 99.5%; pH=9.79; particle size was 320 nm.; viscosity was 155 centipoises with a trace of 100 mesh gel.

TABLE 4.1

| Monomer Emulsion for Example 4 (ME #1) | |
| --- | --- |
| DI water | 2740. g. |
| DS-4 (surfactant; 23%) | 46.9 g. |

TABLE 4.1-continued

| Monomer Emulsion for Example 4 (ME #1) | |
| --- | --- |
| Butyl acrylate | 7061.3 g. |
| Methyl methacrylate | 3654.2 g. |
| Methacrylic acid | 89.7 g. |

EXAMPLE 5

Preparation of Latex Polymer

Preparation of Comparative Sample C. To a 5 gallon stirred, jacketed reactor fitted with a nitrogen sparge tube which contained 5100 g. of DI water was added 13.8 g. of ALIPAL ® CO-436 (58%) and 100 g. of DI water used to wash the surfactant container. The contents of the reactor were heated to 82 C. The nitrogen which had been purging the kettle for 15 minutes was turned off. 500 g. of the monomer emulsion (ME #1) was added to the kettle and washed in with 50 g. DI water. Two minutes later the temperature was 79 C. and 35 g. ammonium persulfate in 200 g. DI water was added. An exotherm was observed with the temperature rising to 84.2 C. in 2.5 minutes. Ten minutes later the temperature was 82 C. and the gradual, simultaneous feed of 11,862.4 g. of ME #1 and a solution of 5 g. ammonium persulfate in 500 g. DI water were begun at a rate of 35.9 g./min. for ME #1 and 1.5 g./min. for the ammonium persulfate solution. Twenty minutes later the temperature was 81.4 C. and the feed rates were doubled. With slight cooling the temperature was maintained at 81-82 C. for the next 159 minutes until the feeds were completed. Twenty-six minutes later the temperature was 80 C. and cooling was begun. Twenty-five minutes later the temperature was 55 C. and 45 g. of 0.15% ferrous sulfate solution, 9.5 g. of t-butyl hydroperoxide (70%) in 70 g. DI water, and 4.75 g. sodium sulfoxylate formaldehyde in 140 g. DI water were added. Twenty minutes later the temperature was 54 C. and 9.5 g. t-butyl hydroperoxide in 70 g. DI water and 4.75 g. sodium sulfoxylate formaldehyde in 140 g. DI water were added. Twenty minutes later the temperature was 53 C. and 95 g. styrene was added over a five minute period, at the end of which 9.5 g. t-butyl hydroperoxide (70%) in 70 g. sodium sulfoxylate formaldehyde in 140 g. DI water were added over a five minute period. Then, in sequence, 500 g. DI water, 50 g. aqueous ammonia (28%), 7.2g. PROXEL ® CRL, and 25.5 g. benzophenone in 17 g. xylene were added after the batch had cooled to ambient temperature. The resulting latex had 51.3% solids, pH=8.1, a Brookfield viscosity of 247 centipoises, and a particle size of 171 nm.

TABLE 5.1

| Monomer Emulsion for Example 5. (ME #1) | |
| --- | --- |
| DI water | 1210 g. |
| ALIPAL ® CO-436 (58%) | 72.4 g. |
| Butyl acrylate | 8400 g. |
| Acrylonitrile | 1140 g. |
| Acrylic acid | 100 g. |
| N-Methylol methacrylamide (25%) | 1440 g. |

EXAMPLE 6

Preparation of Latex Polymer

Preparation of Sample 3. To a 5 gallon stirred, jacketed reactor fitted with a nitrogen sparge tube which contained 6412.5 g. of DI water was added 39.80 g. of SIPONATE ® DS-4 (23%). The reactor was purged with nitrogen for 15 minutes and the temperature raised to 84.5 C. A solution of 32.5 g. sodium persulfate in 180 g. DI water was added. The temperature dropped to 82.5 C. within two minutes, at which time 450 g. of ME #1 was added. Within three minutes, an exotherm to 58.5 C. was noted. Ten minutes later the temperature was at 83.5 and the addition of the remainder of ME #1 and a catalyst solution of 8.45 g. sodium persulfate in 337.5 g. DI water were begun simultaneously. After 177 minutes with intermittent cooling which maintained the temperature between 82.5-84 C. the feeds were complete. The ME #1 line was rinsed into the reactor with 180 g. of DI water. Over a period of 52 minutes, the reaction mixture was cooled to 54 C. Three identical additions of 9.9 g. t-butyl hydroperoxide in 45 g. DI water and 5.95 g. sodium sulfoxylate formaldehyde in 90 g. of DI water were added, with an additional 25 g. of ferrous sulfate heptahydrate (0.15%) with the first addition, with a 30 minute hold period after each addition. The temperature fell from 54 C. to 50 C. during this period. After 30 minutes of cooling the temperature was at 35 C. and 177.2 g DI water was added. The resultant latex had a solids content of 45.5%, pH=2.30, a Brookfield viscosity of 115 centipoises, and a particle size of 149 nanometers. To 439.5 g. of the above-prepared latex polymer at 45.5% solids was added ammonia to a pH=7.5. Then 1568.6 g. of Comparative Sample C of Example 5 of this application at 51% solids was added with agitation. This blend is Sample 3.

TABLE 6.1

| Monomer Emulsion for Example 6 (ME #1) | |
|---|---|
| DI water | 2565 g. |
| SIPONATE ® DS-4 (23%) | 318.6 g. |
| Butyl acrylate | 3311.5 g. |
| Methyl methacrylate | 5480.1 g. |
| N-methylol acrylamide (45%) | 814.1 g. |

EXAMPLE 7

Preparation of Elastomeric Wall Coating

Grind the following ingredients in a Cowles disperser at high speed for 15 minutes. All quantities are in grams.

| | |
|---|---|
| Anionic dispersant (TAMOL ® 731) | 12.7 |
| Defoamer (FOAMASTER ® AP) | 2.5 |
| Bacteriocide (DOWICIL ® 75 (25% in water)) | 6.0 |
| Propylene glycol | 45.0 |
| Water | 5.0 |
| Titanium Dioxide (TIPURE ® R900) | 176.67 |
| Then let down with the following ingredients, in order: | |
| Latex (at 50% solids) | 687.4 |
| Ammonium hydroxide (28%) | 1.0 |
| Defoamer (FOAMASTER ® AP) | 3.0 |
| Thickener (NATROSOL ® 250 MR; 2.5% solids) | 58.8 |

EXAMPLE 8

Effect of N-methylol Functionality and Two Polymer Composition on Elastomeric Wall Coating (EWC) Properties To an aluminum test panel (ALODINE ® 1200S) a film of the coating of Example 7 utilizing the latex binders as noted in Table 8.1 was applied to a dry film thickness of 16-18 mils by application of two identical coats with three days air-dry between coats. The panels were then dried under ambient conditions for 7-14 days before testing. Surface tack was measured by finger touch on the coating which had been air-dried for 7 days, with a rating assigned by the operator. Yellowing was measured on coatings which had been air-dried for 7 days. The coated panel was immersed in 5% NaOH solution for 3 days. Yellowing of the coating was observed visually and rated by the operator. Dirt Pick-up resistance was measured on coatings which were exposed in a QUV cabinet for 4 hours using only two UV-B bulbs on one side only and no humidity cycle. The temperature of the coatings at the end of this cycle was a maximum of 100 F. The coatings were then removed and then coated with a brown iron oxide slurry. They were set aside for one hour under ambient conditions and then washed with water. The values reported were % Reflectance retained, i.e., 100 means no dirt pick-up; lower ratings indicate dirt pick-up as indicated by discoloration. Panels were coated and dried for three days under ambient conditions, and then at 50 C. for seven days. They were egilibrated at the temperatures given in the Table and then bent 180 degrees over an ⅛" mandrel; cracking of the coating is rated as a failure. For elongation/tensile testing an INSTRON ® tensile tester was used. The coating of Example 7 using the binders indicated in Table 8.1 was cast on a Teflon coated plate at a dry film thickness of 20 mils and allowed to dry for 14 days. The coating was peeled off and turned after 7 days to promote through-dry. After 14 days the specimen was cut with a dumb-bell shaped die measuring 3" long by ¾" wide with a neck width of ¼". The INSTRON ® tensile tester was then used to determine tensile and elongation properties at the stated temperature, using the following settings: cross head speed was 2.0 in./min. and gauge length was 1.0 inch.

TABLE 8.1

| EWC properties from Example 8 | | |
|---|---|---|
| Binder | Sample 2 | Comparative Sample B |
| Surface Tack | Very slight | Slight |
| Yellowing | None | None |
| Dirt Pick-up Resistance | 99 | 99 |
| Flexibility, 0 C. | Pass | Pass |
| −10 C. | Pass | Pass |
| −20 C. | Pass | Fail |
| % Elongation/Tensile (psi) | | |
| 25 C. | 555/577 | 800/157 |
| 0 C. | 449/1000 | 350/1000 |
| −10 C. | 238/1800 | 47/3000 |

The method of this invention-using Sample 2 in the EWC formulation of Example 7—yields an EWC with superior elongation/tensile balance, particularly with less sensitivity to temperature; it also offers inprovements in tack and low temperature flexibility.

EXAMPLE 9

Effect of Two Polymer Composition on EWC Properties

Samples for testing were prepared in accordance with the method of Example 8, with an 18 mil dry film thickness and drying for 7 days. Test methods used were detailed in Example 8. Additionally, gloss was measured using a Hunter Glossmeter Model D 48D on dried coatings prepared as noted.

TABLE 9.1

| Binder | EWC properties for Example 9 | | | |
|---|---|---|---|---|
| | Sample 1 | Comparative A | Sample 3 | Comparative C |
| Surface Tack | Moderate | Mod-Heavy | Slight | Mod-Heavy |
| Yellowing (NaOH soak) | None | None | None | Light |
| Gloss 20/60 | 14/58 | 24/65 | 20/61 | 29/72 |
| Dirt Pick-up Resist. | 97 | 95 | 99 | 99 |
| % Elongation at Break | | | | |
| 25 C. | 406 | 596 | 489 | 728 |
| 0 C. | 313 | 556 | 385 | 621 |
| −10 C. | 228 | 304 | 157 | 392 |
| Maximum Tensile (psi) | | | | |
| 25 C. | 532 | 588 | 616 | 740 |
| 0 C. | 1300 | 1200 | 1200 | 1600 |
| −10 C. | 1700 | 2100 | 2100 | 2100 |
| ⅛" Bend | | | | |
| −10 C. | Pass | Pass | Pass | Pass |
| −20 C. | Pass | Pass | Pass | Pass |

Sample 1 and Sample 2 are compositions used in the method of this invention. The second polymer component in Sample 1 relative to Comparative A and the second polymer component in Sample 2 relative to Comparative C provide an improvement in surface tack while maintaining low temperature flexibility, tensile properties, gloss, and dirt pick-up resistance.

EXAMPLE 10

Evaluation of Dry Times

Test coatings for elongation/tensile testing were prepared as in Example 8.

Set time was measured on 10 mil wet film thickness films cast on aluminum panels. The time required for the film to set based on finger touch was recorded. Tack-free times were run as a continuation of the set time test. A Zapon tack tester, which is an aluminum strip bent to an included angle of 135 degrees, is placed on the surface of the coating with one arm of the tester placed flat on the coating with a finger touch; if the tester falls within 5 seconds, the tack-free time has been reached. When the finger touch (called 0 g. Zapon) tack-free time has been reached, the test is repeated with application of a 100 g. weight for 5 seconds, then allowing 5 seconds for the tester to fall. When this "100 g. Zapon" tack-free time is attained, the test is continued in like manner using a 500 g. weight.

TABLE 10.1

| Binder | Running track coating properties | | |
|---|---|---|---|
| | Sample 1 | Sample 3 | Comparative C |
| Set time (minutes) | 3.6 | 4.0 | 8.4 |
| Tack-free Time | | | |
| 0 g. Zapon | 5.6 | 6.0 | 57.4 |
| 100 g. Zapon | 7.6 | 11.0 | 62.4 |
| 500 g. Zapon | 44.6 | 13.0 | 960.% |
| Elongation/Tensile Str. (psi) | | | |
| 25 C. | 208/136 | 385/162 | 1492/133 |
| 0 C. | 484/228 | 532/337 | 972/326 |
| −10 C. | 730/500 | 495/834 | 774/790 |

The clear coats were selected to simulate relative drying rates of running track coatings. The binders utilized in the method of this invention—Sample 1 and Sample 3—exhibit large improvements in set and tack-free time, relative to Comparative Sample C.

What is claimed is:

1. A method for use of an aqueous elastomeric coating comprising:
   (a) forming an ambient-temperature-drying coating composition comprising at least two mutually incompatible water-insoluble polymers prepared by the polymerization of ethylenically unsaturated monomers, wherein at least one of said polymers comprises N-methylol functionality; and
   (b) applying said composition to a surface;
   (c) drying said coating composition at a temperature lower than about 50° C.

2. The method of claim 1 wherein at least one of said polymers has a glass transition temperature lower than about 20 C.

3. The method of claim 2 wherein said polymer with a glass transition temperature lower than about 20 C. is present in an amount of from about 25% to about 99% by weight based on the weight of all polymer components.

4. The method of claim 1 wherein said functionality comprises at least one copolymerized N-methylol functional ethylenically unsaturated monomer.

5. The method of claim 4 wherein said monomer is selected from the group consisting of N-methylol acrylamide, N-methylol methacrylamide, and mixtures thereof.

6. The method of claim 4 wherein said monomer is present in an amount of from about 1% to about 6% by weight based on the weight of polymer containing said functionality.

7. The method of claim 1 wherein said composition is prepared by the process comprising:
   (a) emulsion polymerizing at least one mono-ethylenically unsaturated monomer to form an initial dispersion of initial water insoluble latex polymer containing essentially no sites of ethylenic unsaturation and further containing N-methylol fuctionality,
   (b) dispersing ethylenically unsaturated monomer including monomer having at least two sites of ethylenic unsaturation into said initial dispersion whereby said dispersed monomer swells said dispersed said initial latex polymer,
   (c) polymerizing said dispersing ethylenically unsaturated monomer within said monomer swollen initial latex polymer; and
   (d) where the final composition of said latex polymer containing said polymerized ethylenically unsaturated monomer dispersed in said initial latex polymer comprises from about 67 to about 99 percent by weight initial latex polymer and from about 33 to about 1 percent by weight polymerized ethylenically unsaturated polymer dispersed therein.

8. The method of claim 7 wherein the glass transition temperature of said initial latex polymer is lower than about 20 C.

9. The method of claim 7 wherein said functionality results from the copolymerization of functional monomer selected from the group consisting of N-methylol acrylamide, N-methylol methacrylamide, and mixtures thereof.

10. The method of claim 9 wherein said functional monomer is incorporated into said initial polymer in an amount of from about 1% to about 6% by weight based on weight of said initial polymer.

11. The method of claim 1 or claim 7 wherein said substrate surface is a cementitious wall.

12. The method of claim 1 or claim 7 wherein said substrate surface is a sports surface.

* * * * *